(12) United States Patent  
Lai et al.

(10) Patent No.: US 7,624,961 B2  
(45) Date of Patent: Dec. 1, 2009

(54) STAND FOR SUPPORTING COMPUTER

(75) Inventors: Hsiu-Chang Lai, Taipei Hsien (TW); Zheng-Heng Sun, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 35 days.

(21) Appl. No.: 11/923,657

(22) Filed: Oct. 25, 2007

(65) Prior Publication Data

US 2008/0123275 A1    May 29, 2008

(30) Foreign Application Priority Data

Nov. 24, 2006    (CN) .................. 2006 1 0201142

(51) Int. Cl.  
*A47B 91/00*    (2006.01)
(52) U.S. Cl. ................ 248/346.03; 248/174; 248/176.1
(58) Field of Classification Search ............ 248/346.03, 248/346.5, 146, 152, 158, 174, 176.1, 309.1, 248/300, 902; 220/501, 505, 4.02; 361/683, 361/679; 312/223.2  
See application file for complete search history.

(56) References Cited

U.S. PATENT DOCUMENTS

| 4,815,683 | A | * | 3/1989 | Ferrante ................. 248/205.2 |
| 5,955,170 | A | * | 9/1999 | Davis et al. ................. 428/81 |
| 6,527,135 | B1 | * | 3/2003 | Braun et al. ............... 220/4.02 |
| 2003/0234329 | A1 | * | 12/2003 | Kobayashi ............... 248/309.1 |
| 2004/0159756 | A1 | * | 8/2004 | Albertson ................ 248/227.1 |
| 2008/0278899 | A1 | * | 11/2008 | Hotelling et al. ............ 361/683 |

FOREIGN PATENT DOCUMENTS

FR         2812132  A1     1/2002

* cited by examiner

*Primary Examiner*—Ramon O Ramirez  
(74) *Attorney, Agent, or Firm*—Frank R. Niranjan

(57) ABSTRACT

A stand for supporting a computer includes a first receiving space configured for retaining a computer enclosure of the computer, and a second receiving space formed in the vicinity of the first retainer configured for retaining a power supply of the computer.

13 Claims, 5 Drawing Sheets

STAND FOR SUPPORTING COMPUTER

BACKGROUND

1. Field of the Invention

The present invention relates to stands, and particularly to a stand stably supporting a computer enclosure and a power supply.

2. Description of Related Art

Currently, due to a compact size trend, a computer enclosure is thinner and thinner, and a power supply supplying power for the computer can not be retained in the computer enclosure. Therefore, the power supply is located outside the computer enclosure. However, the power supply is often loosely placed beside the computer enclosure, which is untidy and inconvenient.

What is needed is to provide a stand which stably supports a computer enclosure and a power supply together.

SUMMARY

In one embodiment, a stand for supporting a computer includes a first receiving space configured for retaining a computer enclosure of the computer, and a second receiving space formed in the vicinity of the first receiving space and configured for retaining a power supply of the computer.

Other advantages and novel features of the present invention will become more apparent from the following detailed description of an embodiment when taken in conjunction with the accompanying drawings, in which:

DETAILED DESCRIPTION

Figure 1:
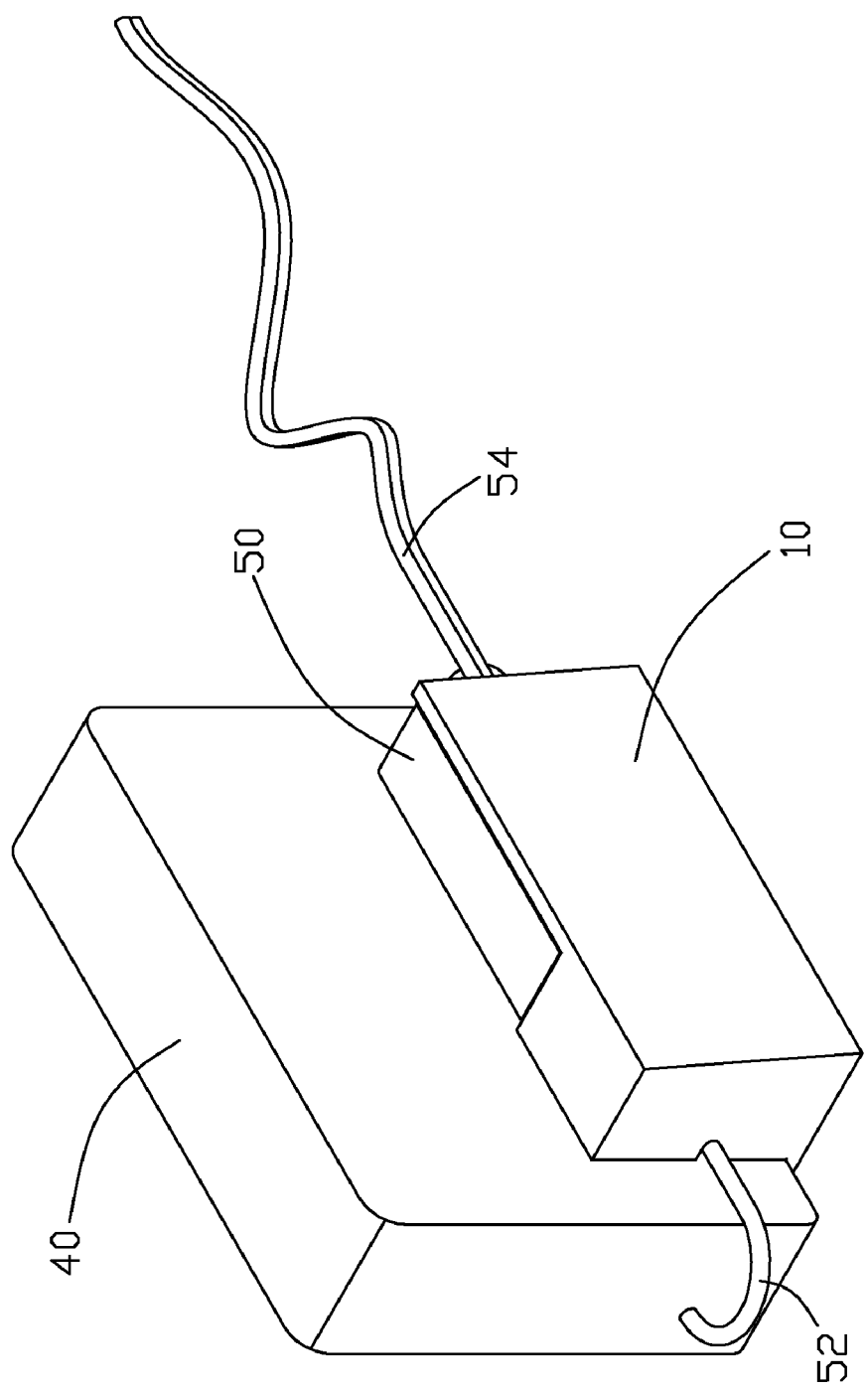
FIG. 1 is an assembled, isometric view of a stand in accordance with an embodiment of the present invention, together with a computer enclosure, and a power supply.
Figure 2:
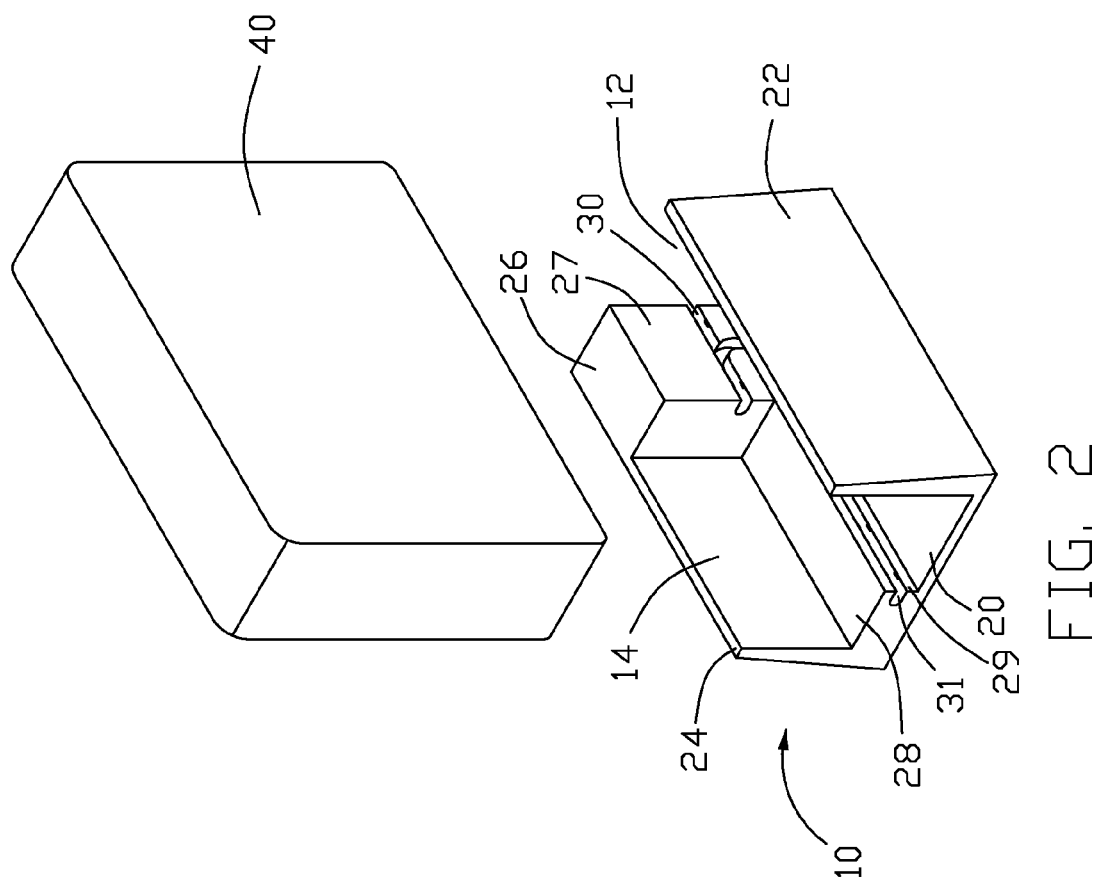
FIG. 2 is an exploded, isometric view of the stand and the computer enclosure of FIG. 1, but viewed from another aspect.

Referring to FIGS. 1 and 2, a stand 10 for supporting a computer enclosure 40 and a power supply 50 in accordance with an embodiment of the present invention includes a first receiving space 12, and a second receiving space 14 formed in the vicinity of the first receiving space 12.

The power supply 50 transforms alternating current (AC) to direct current (DC), and supplies power to the computer enclosure 40. One end of a DC wire 52 and one end of an AC wire 54 are electrically connectable to opposite ends of the power supply 50, respectively. The other end of the DC wire 52 is electrically connected to the computer enclosure 40. The other end of the AC wire 54 is electrically connected to the AC electric supply.

Figure 3:
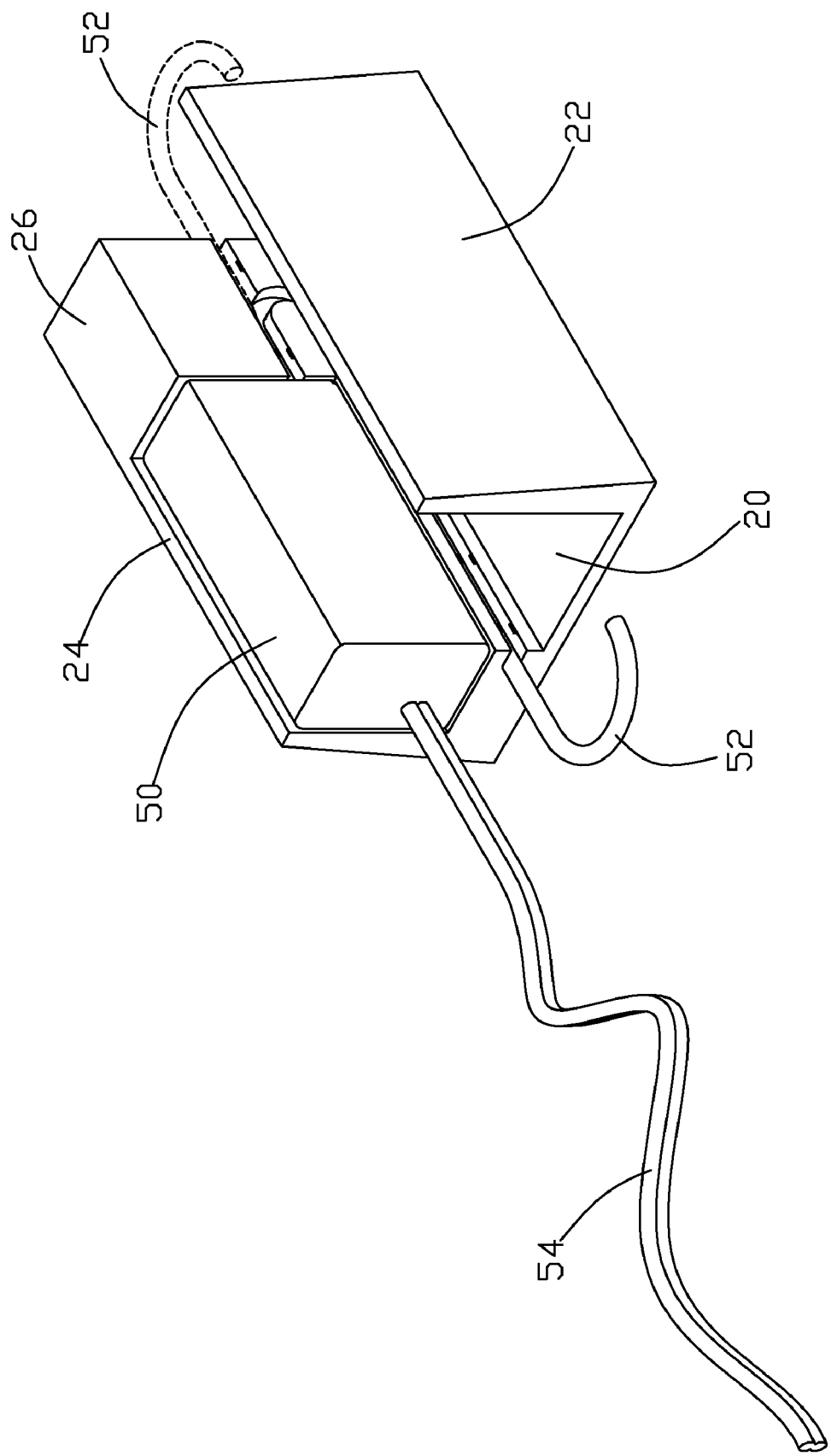
FIG. 3 is an assembled, isometric view of the stand and the power supply of FIG. 1, but viewed from another aspect.
Figure 4:
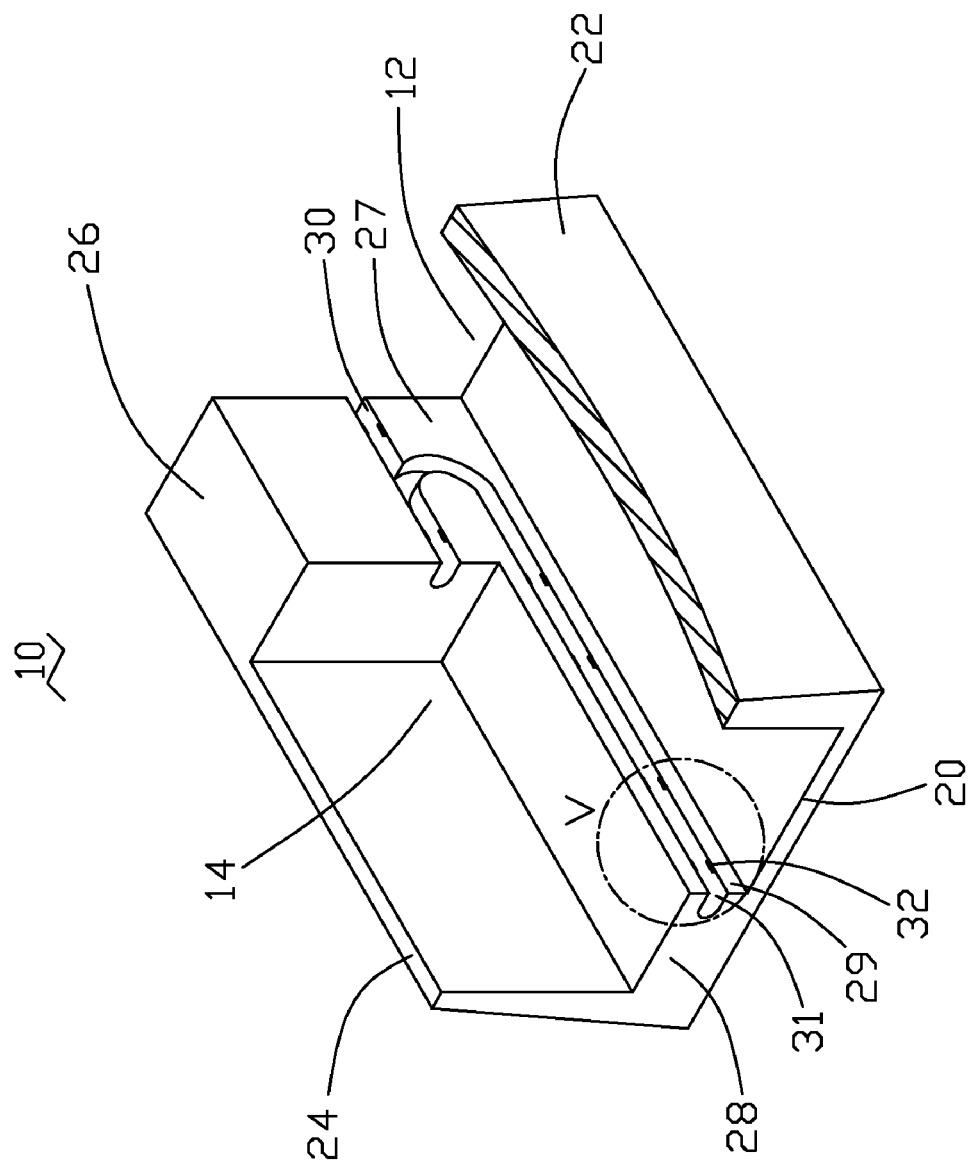
FIG. 4 is an enlarged, partially cutaway view of the stand of FIG. 2.

Referring also to FIGS. 3 and 4, the stand 10 is generally U-shaped, and includes a bottom wall 20, a first sidewall 22 and a second sidewall 24 extending up from opposite sides of the bottom wall 20 respectively. A rectangular support portion 28 is formed on the bottom wall 20 and connected to the second sidewall 24. A length of the support portion 28 is equal to that of the second sidewall 24. A blocking portion 26 extends up from an end of the support portion 28 and is connected to the second sidewall 24. A width of the blocking portion 26 is equal to that of the support portion 28. A side surface 29 of the support portion 28 facing the first sidewall 22, and a side surface 27 of the blocking portion 26 facing the first sidewall 22, are coplanar.

The first receiving space 12 is formed in the stand 10 and located between the first sidewall 22 and the side surfaces 29, 27 of the support portion 28 and the blocking portion 26. The second receiving space 14 is formed in the stand 10, and restricted by the second sidewall 24, the support portion 28, and the blocking portion 26.

Figure 5:
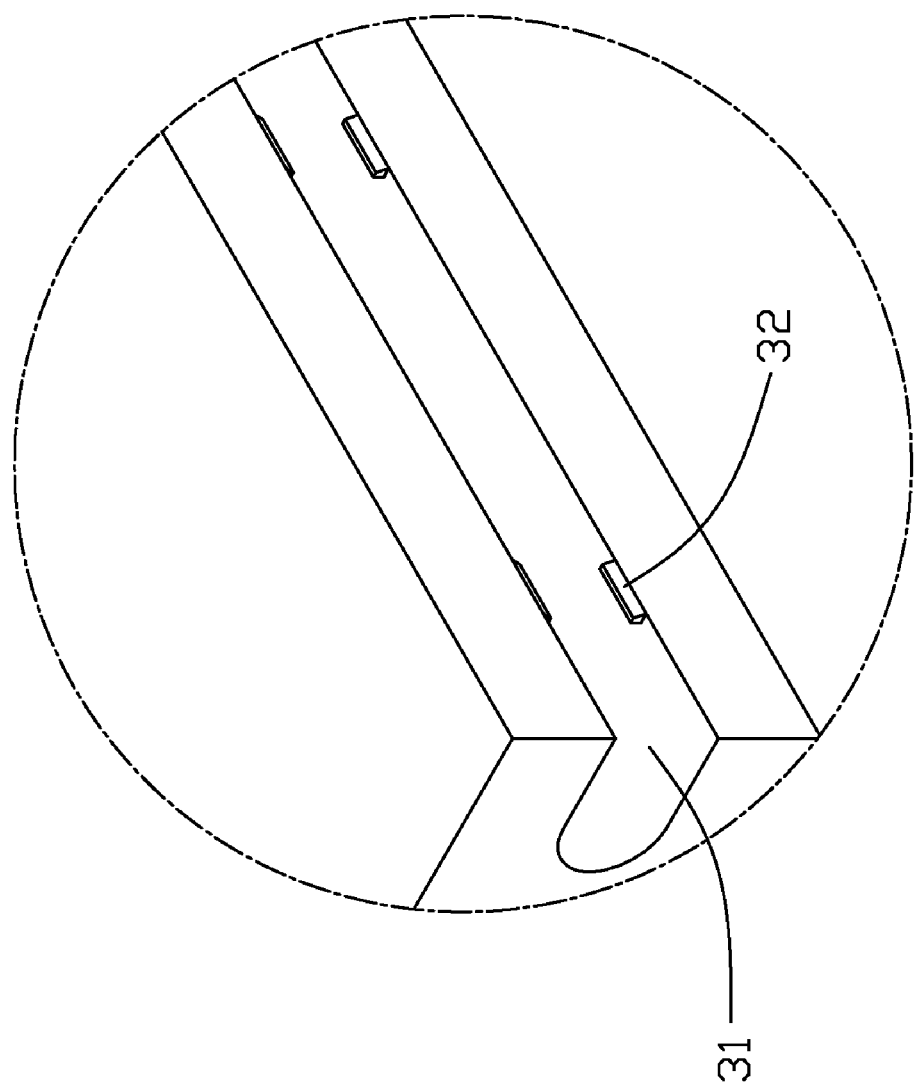
FIG. 5 is an enlarged view of a circled part V of FIG. 4.

A first slot 30 parallel to the bottom wall 20 is defined in the side surface 27 of the blocking portion 26. A second slot 31 parallel to the bottom wall 20 is defined in the side surface 29 of the support portion 28. One end adjacent the blocking portion 26, of the second slot 31 extends up to join with a middle portion of the first slot 30. A plurality of limiting parts 32 is formed on two opposite inner surfaces of the first and second slots 30, 31 respectively, as shown in FIG. 5.

In use, the computer enclosure 40 is retained in the first receiving space 12 of the stand 10, with a side thereof contacting the first sidewall 22, and an opposite side thereof contacting the side surface 27 of the blocking portion 26 and the side surface 29 of the support portion 28. The bottom of the computer enclosure 40 is supported on the bottom wall 20 in the first receiving space 12, of the stand 10. The power supply 50 is retained in the second receiving space 14 of the stand 10. The power supply 50 is supported on the support portion 28. One side of the power supply 50 contacts the second sidewall 22 of the stand 10, the opposite side of the power supply 50 contacts the computer enclosure 40, and an end of the power supply 50 contacts the blocking portion 26. The DC wire 52 extends through the first slot 30 to connect the power supply 50 to one end of the computer enclosure 40. Obviously, the DC wire 52 can also extend through a part adjacent the power supply 40, of the first slot 30, and the second slot 31 to connect the power supply 40 to an opposite end of the computer enclosure 40, meanwhile the AC wire 54 can extend through the first slot 30 or through a part adjacent the power supply 40, of the first slot 30, and the second slot 31, if the computer enclosure 40 is reversely placed. The limiting parts 32 can prevent the DC wire 52 and the AC wire 54 from disengaging from the first and second slots 30, 31.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An integral stand for supporting a computer which comprises a computer enclosure and a power supply located outside of the computer enclosure, comprising:
    a first receiving space configured for retaining the computer enclosure of the computer;
    a second receiving space formed in the vicinity of the first receiving space and configured for retaining the power supply of the computer;
    a bottom wall;
    a first sidewall extending from one side of the bottom wall;
    a second sidewall extending from an opposite side of the bottom wall;

a support portion formed on the bottom wall adjacent to the second sidewall; and a blocking portion formed at one end of the support portion;

wherein the first receiving space is located between the first sidewall and side surfaces facing the first sidewall, of the support portion and the blocking portion;

wherein the second receiving space is restricted by the second sidewall, the support portion, and the blocking portion.

2. The integral stand as claimed in claim 1, wherein the blocking portion defines a first slot in the side surface thereof, configured for wires connected between the power supply and one end of the computer enclosure adjacent to the blocking portion, extending therethrough.

3. The integral stand as claimed in claim 2, wherein a second slot is defined in the side surface of the support portion, with an end joining with a middle portion of the first slot, configured for the wires extending therethrough when the wires are connected between the power supply and an opposite end of the computer enclosure away from the blocking portion.

4. The integral stand as claimed in claim 3, wherein a plurality of limiting parts is formed on two opposite inner surfaces of the first and second slots respectively, configured for preventing the wires from disengaging therefrom.

5. A stand for supporting a computer, comprising:
a bottom wall;
a first sidewall extending from one side of the bottom wall;
a second sidewall extending from the opposite side of the bottom wall;
a support portion formed on the bottom wall and adjacent to the second sidewall; and
a blocking portion formed on one end of the support portion;
wherein the bottom wall, the first sidewall, and the support portion cooperatively form a first receiving space configured for retaining a computer enclosure of the computer;
wherein the second sidewall, the support portion, and the blocking portion cooperatively form a second receiving space configured for retaining a power supply of the computer.

6. The integral stand as claimed in claim 5, wherein the blocking portion defines a first slot in the side surface thereof, configured for wires connected between the power supply and one end of the computer enclosure adjacent to the blocking portion, extending therethrough.

7. The integral stand as claimed in claim 6, wherein a second slot is defined in the side surface of the support portion, with an end joining with a middle portion of the first slot, configured for the wires extending therethrough when the wires are connected between the power supply and an opposite end of the computer enclosure away from the blocking portion.

8. The integral stand as claimed in claim 7, wherein a plurality of limiting parts is formed on two opposite inner surfaces of the first and second slots respectively, configured for preventing the wires from disengaging therefrom.

9. A combination comprising:
an integral stand comprising a bottom wall, a first sidewall extending from one side of the bottom wall, a second sidewall extending from an opposite side of the bottom wall, a support portion formed on the bottom wall and adjacent to the second sidewall, and a blocking portion formed on one end of the support portion, a first receiving space being defined between the first sidewall and side surfaces facing the first sidewall, of the support portion and the blocking portion, a second receiving space being defined between the second sidewall, the support portion, and the blocking portion;
a computer enclosure being received in the first receiving space; and
a power supply configured for providing power to electronic components installed within the computer enclosure being received in the second receiving space.

10. The combination as claimed in claim 9, wherein one side of the power supply contacts the second sidewall of the stand, and the opposite side of the power supply contacts the computer enclosure, and an end of the power supply contacts the blocking portion.

11. The combination as claimed in claim 10, wherein one side of the computer enclosure contacts the first sidewall and an opposite side of the computer enclosure contacts the power supply and the blocking portion.

12. The combination as claimed in claim 9, wherein the blocking portion defines a first slot in the side surface thereof, configured for wires connected between the power supply and one end of the computer enclosure adjacent to the blocking portion, extending therethrough.

13. The integral stand as claimed in claim 12, wherein a second slot is defined in the side surface of the support portion, with an end joining with a middle portion of the first slot, configured for the wires extending therethrough when the wires are connected between the power supply and an opposite end of the computer enclosure away from the blocking portion.

* * * * *